(12) United States Patent
Van De Vanter

(10) Patent No.: US 10,393,443 B1
(45) Date of Patent: Aug. 27, 2019

(54) ROOFTOP PACKAGED HEATING, VENTILATING AND AIR CONDITIONING SYSTEM UTILIZING PHASE CHANGE MATERIALS

(71) Applicant: Neal Energy Management, LLC, Boulder City, NV (US)

(72) Inventor: James L. Van De Vanter, San Luis Obispo, CA (US)

(73) Assignee: Neal Energy Management, LLC, Boulder City, NV (US)

( * ) Notice: Subject to any disclaimer, the term of this patent is extended or adjusted under 35 U.S.C. 154(b) by 856 days.

(21) Appl. No.: 14/034,126

(22) Filed: Sep. 23, 2013

(51) Int. Cl.
*F28C 3/08* (2006.01)

(52) U.S. Cl.
CPC ..................... *F28C 3/08* (2013.01)

(58) Field of Classification Search
CPC .... F28C 3/08; F28C 3/18; F28D 1/024; F28B 1/02; F25B 49/02
See application file for complete search history.

(56) References Cited

U.S. PATENT DOCUMENTS

| | | | | | |
|---|---|---|---|---|---|
| 4,738,120 | A | * | 4/1988 | Lin | F24F 3/1423 62/272 |
| 4,952,283 | A | * | 8/1990 | Besik | F24F 3/1411 165/4 |
| RE37,464 | E | * | 12/2001 | Meckler | F24F 3/06 62/271 |
| 7,735,327 | B2 | | 6/2010 | Brower et al. | |
| 7,797,950 | B2 | | 9/2010 | Brower et al. | |
| 8,875,526 | B1 | * | 11/2014 | Isaacson | F24F 3/153 62/89 |
| 2008/0034774 | A1 | * | 2/2008 | Brower | F24F 5/0017 62/259.1 |
| 2010/0212345 | A1 | * | 8/2010 | Yoon | F24F 3/1423 62/271 |
| 2010/0307175 | A1 | * | 12/2010 | Teige | F24F 3/1423 62/94 |
| 2013/0228308 | A1 | * | 9/2013 | Abhari | C09K 5/063 165/104.17 |

FOREIGN PATENT DOCUMENTS

| | | | | |
|---|---|---|---|---|
| EP | 1455156 | A2 * | 9/2004 | C09K 5/063 |
| EP | 1455156 | A2 * | 9/2004 | C09K 5/063 |

* cited by examiner

*Primary Examiner* — Emmanuel E Duke
(74) *Attorney, Agent, or Firm* — FisherBroyles, LLP; Rob L. Phillips

(57) ABSTRACT

A cooling system incorporates a return air duct, phase change module, first exhaust duct, second exhaust duct, HVAC module and duct extending from the phase change module to the HVAC module. In a retrofit version, an existing building return of a conventional HVAC system is re-routed to the phase change system and the output of the phase change system is connected to the return side of the existing HVAC system. Standalone cooling systems are also disclosed. In either version, the phase change module receives return air via the return duct and external ambient air via one or more inlets. Mixed return air and external ambient air are forced by a blower/fan to the evaporative cooler, rotating housing containing phase change material, dehumidifier and a subject area to be cooled.

20 Claims, 6 Drawing Sheets

ROOFTOP PACKAGED HEATING, VENTILATING AND AIR CONDITIONING SYSTEM UTILIZING PHASE CHANGE MATERIALS

FIELD OF THE INVENTION

The embodiments of the present invention relate to a heating, ventilating, and air conditioning (HVAC) system incorporating a phase change material to condition indoor spaces for human comfort and air quality. The phase change material will exchange energy with supply air, outside air, return air, exhaust air, ambient air, and the earth.

BACKGROUND

Conventional HVAC equipment conditions outside/return air and delivers it into an occupied space creating a quality human environment. Electricity, gas, and solar are energies used to produce the heating and cooling effect and consumption is increasing as more buildings are being built. As a result, we are continually increasing our carbon footprint as well as overloading our electrical grids.

Phase change materials (PCM's) are materials that change phase between solid/liquid at variable discrete temperatures. Known phase change materials include perlite, paraffin compounds (linear crystalline alkyl hydrocarbons), sodium sulfate, fatty acids, salt hydrates and calcium chloride hexahydrate. While this list is not exhaustive, it is representative of the materials which exhibit properties common to phase change materials.

U.S. Pat. Nos. 7,735,327 and 7,797,950, incorporated herein by this reference for all purposes, disclose packaged phase change materials used in various active thermal insulation systems.

Accordingly, one system embodiment of the present invention incorporates phase change material into a HVAC system.

SUMMARY

In one retrofit embodiment, an existing building return of a conventional HVAC system is re-routed to the phase change module and the output of the phase change module is connected to the return side of the existing HVAC system. With such a retrofit, the blower of the HVAC system is disconnected and removed. The phase change system may also be fabricated as part of a new HVAC system. In one embodiment, the phase change module receives return air via the return duct and external ambient air via one or more inlets. Mixed return air and external ambient air move through a blower/fan which forces the mixed air to the evaporative cooler and rotating housing containing phase change material in a substantially heat absorbing state, through a dehumidifier and into a subject area to be cooled.

A method of the present invention comprises: forcing a mixture of return air and external ambient air to (i) an evaporative cooler, (ii) a first portion of a rotating housing containing phase change material in a substantially heat absorbing state, (iii) a dehumidifier and (iv) a space to be cooled; and forcing external ambient air to (i) the evaporative cooler, (ii) a second portion of the rotating housing containing phase change material in a substantially heat releasing state and (iii) the atmosphere.

The embodiments of the present invention involve a system and method for utilizing phase change material and return air to cool a subject space. The use of the phase change material and return air creates a more efficient cooling system.

Other variations, embodiments and features of the present invention will become evident from the following detailed description, drawings and claims.

DETAILED DESCRIPTION

Figure 1:
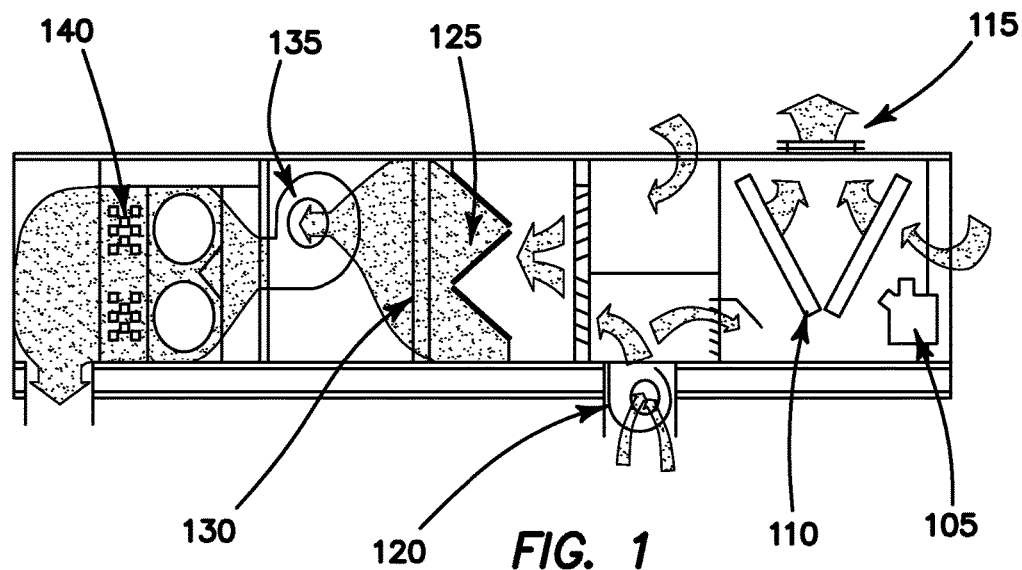
FIG. 1 illustrates a side view of a conventional HVAC system.

For the purposes of promoting an understanding of the principles in accordance with the embodiments of the present invention, reference will now be made to the embodiments illustrated in the drawings and specific language will be used to describe the same. It will nevertheless be understood that no limitation of the scope of the invention is thereby intended. Any alterations and further modifications of the inventive feature illustrated herein, and any additional applications of the principles of the invention as illustrated herein, which would normally occur to one skilled in the relevant art and having possession of this disclosure, are to be considered within the scope of the invention claimed.

As used herein, the term phase change materials means any substance with a high heat of fusion which is capable of storing and releasing large amounts of energy during a phase change (e.g., liquid to a solid or solid to a liquid). Phase change materials include perlite, paraffin compounds (linear crystalline alkyl hydrocarbons), sodium sulfate, fatty acids, salt hydrates and calcium chloride hexahydrate. Those skilled in the art will recognize that the aforementioned list is not exhaustive but simply an exemplary reference of optional phase change materials.

The system described herein may be fabricated into an original HVAC system or may be part of a retrofit system for existing HVAC systems. The system and method described herein may also be fabricated as a stand alone system without the need to retrofit to an existing HVAC system.

As shown in FIG. 1, a conventional rooftop HVAC system 100 comprises a compressor 105, condenser 110, condenser fan 115, return fan 120, air filters 125, cooling coil 130, supply fan 135 and optional heating section 140. In general, a cooling/refrigeration cycle of a conventional rooftop HVAC system 100 involves a compressor 105 pumping a refrigerant gas up to a high pressure and temperature. From there the refrigerant gas enters the condenser 110 (also known as a heat exchanger or condensing coil) where the refrigerant gas loses energy (heat) to the outside, cools, and condenses into a liquid phase. The liquid refrigerant is returned to the cooling coil 130 (also known as a heat exchanger or evaporator) where the liquid refrigerant is allowed to evaporate. A metering device regulates the refrigerant liquid to flow at the proper rate. As the liquid refrigerant evaporates it absorbs energy (heat) from the inside air, returns to the compressor 105, and repeats the cycle. In the process, heat is absorbed from indoors and transferred outdoors, resulting in cooling of the building. The condenser fan 115 exhausts heated air after external ambient air passes the condenser 110, the return fan 120 pushes air from a return air duct in communication with the subject space being cooled back into the HVAC system 100 to mix with external ambient air and the supply fan 135 pushes cooled air into the subject space to be cooled. The air filters 125 capture particulate matter and the like before the cooled air is pushed into the subject space to be cooled by the supply fan 135.

Figure 2A:
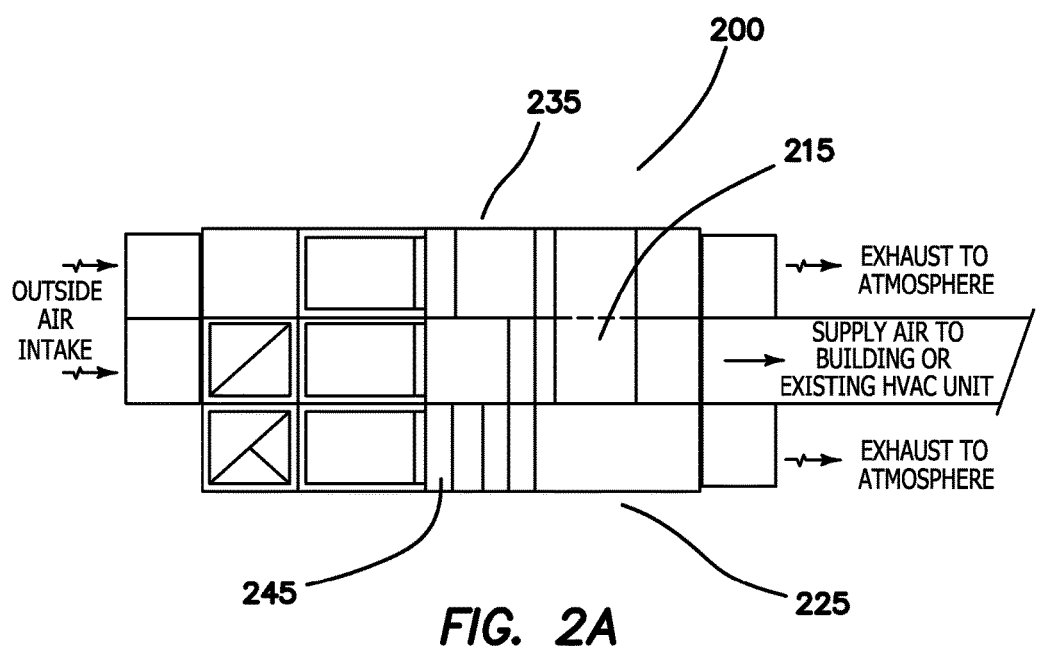
FIGS. 2a and 2b illustrate top and side views of a cooling system according to the embodiments of the present invention integrated with a HVAC system.
Figure 2B:
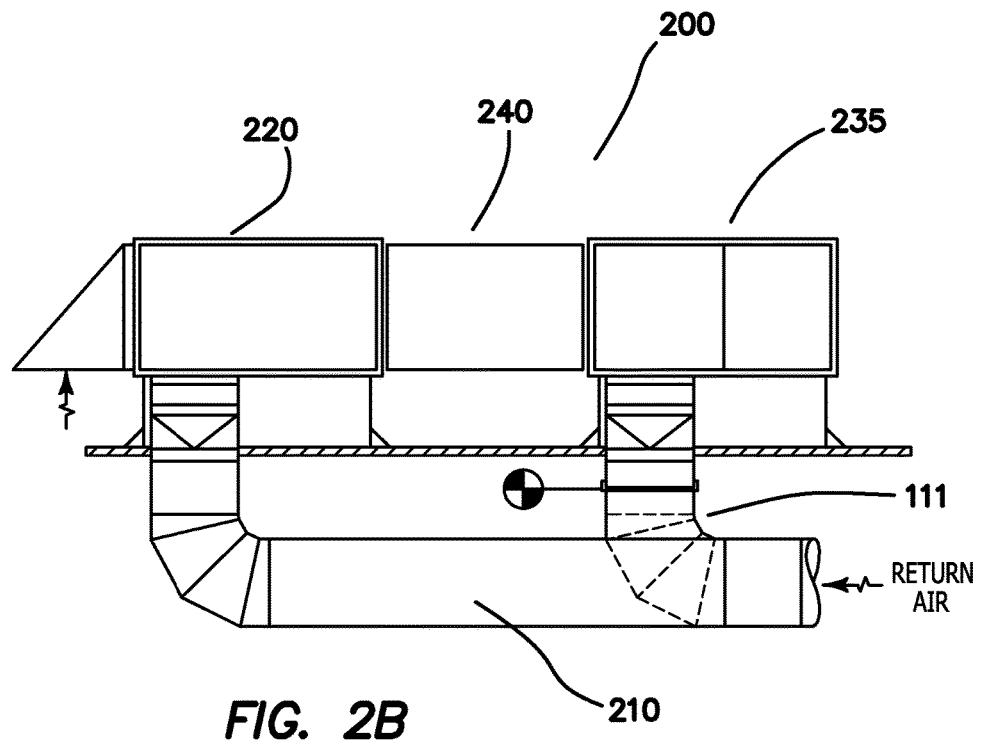

FIGS. 2a and 2b show top and side views of a cooling system 200 according to the embodiments of the present invention integrated with an existing HVAC system. The broad components of the cooling system 200 comprise a return air duct 210, phase change module 220, first exhaust duct 225, second exhaust duct 230, HVAC module 235 and duct 240 extending from said phase change module 220 to said HVAC module 235. As described above, in a conventional HVAC system 100, a return air duct 111 extends from the subject space being cooled back into the HVAC system 100 to mix with external ambient air. In cooling system 100, the return air duct 110 extends from the subject space being cooled into the phase change module 120 and the return air duct 111 is disconnected and capped in lieu of the return air duct 110. A blower/return fan (shown in FIG. 1) associated with the conventional HVAC system 100 is disconnected and removed. A similar blower/return fan (not shown) may be used to push return air into the phase change module 220.

Figure 3:
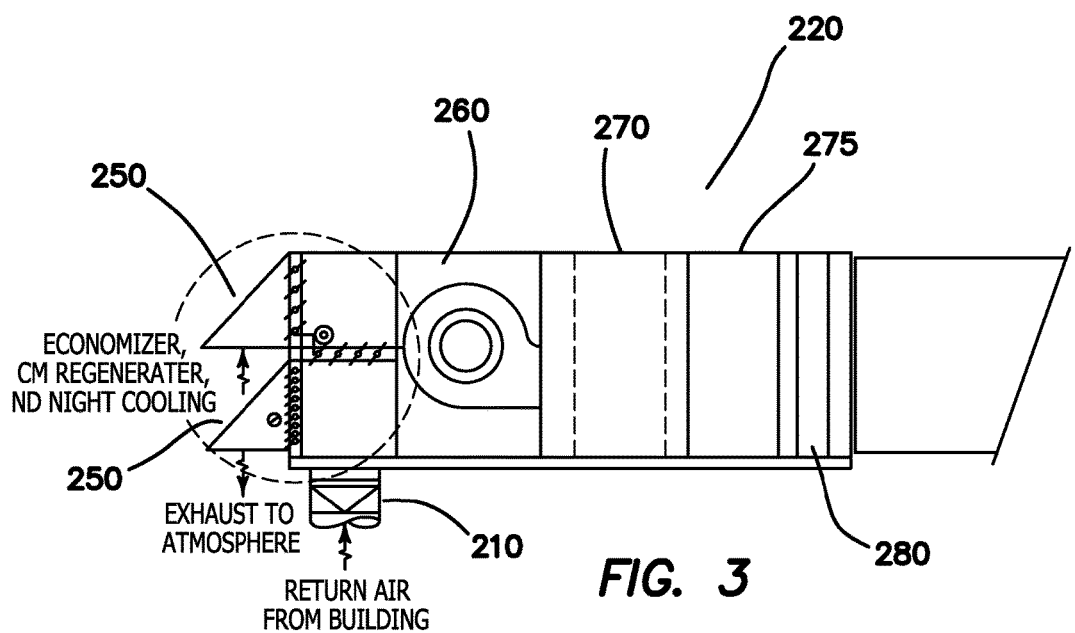
FIG. 3 illustrates a view of a phase change module of the cooling system according to the embodiments of the present invention.

FIG. 3 illustrates one embodiment of the phase change module 220 which receives return air via the return duct 110 and external ambient air via one or more inlets 250. Mixed return air and external ambient air move through a blower/fan 260 which forces the mixed air passed the evaporative cooler 270 and rotating housing 275 containing phase change material, through a dehumidifier 280 and into the subject area to be cooled.

In one embodiment, the dehumidifier 280 comprises a rotating wheel 282 (partially in the supply air duct 215 of the phase change module 220 and partially in a first exhaust duct 225 adjacent to the supply air duct 215) containing a moisture-absorbing silica gel. As the wheel 282 of the dehumidifier 280 rotates, the silica gel absorbs moisture from the supply air duct 215 and the silica gel is re-charged (i.e., moisture evaporated) by the external ambient air in the first exhaust air duct 225. A strip heater 245 may be installed in the exhaust air duct 225 proximate the wheel 282 of the dehumidifier 280 to assist with evaporating moisture from the silica gel contained within the wheel 282 of the dehumidifier 280 for re-entry into the supply air duct 215. A motor 283 drives the rotating wheel 282 of the dehumidifier 280 at a pre-established pace based on certain factors including, but not limited to, external ambient temperature, specifications of the silica gel and desired indoor temperature.

Figure 4:
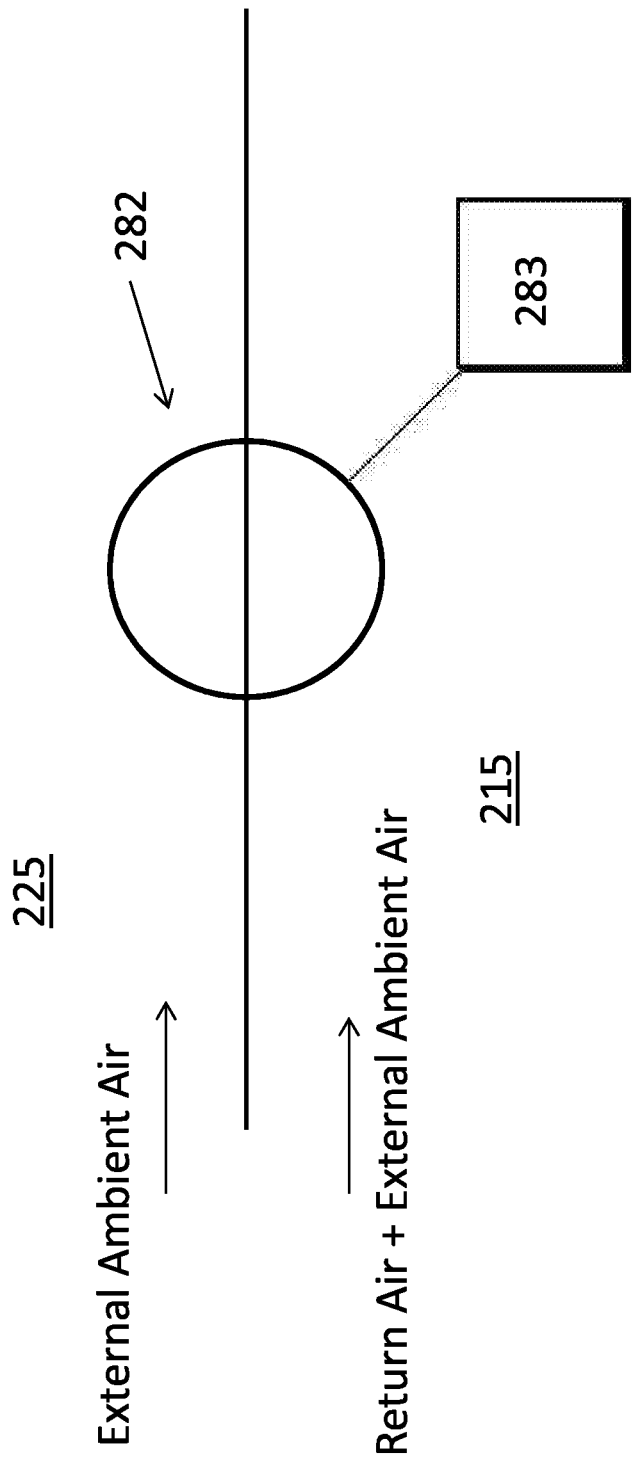
FIG. 4 illustrates a side view of a dehumidifier wheel utilized with a phase change module according to the embodiments of the present invention.

FIG. 4 shows a side view of the wheel of the dehumidifier 280 with half of the wheel 282 in the supply air duct 215 and half of the wheel 282 in the first exhaust air duct 225. While a wheel 282 is described herein, a disc, sphere or other shapes may be used for the housing or container. Also, while silica gel is described herein, other materials may be used to pull moisture from the supply air duct 215.

External ambient air entering the first exhaust air duct 225 is forced by the blower 260 passed the optional strip heater 245 and a portion of the wheel of the dehumidifier 280 and eventually into the atmosphere. In this manner, the heated air re-charges the silica gel in the portion of the wheel of the dehumidifier 280 in the first exhaust duct 225 prior to the silica gel returning to the supply air duct 215. In one embodiment, the silica gel is contained within a plurality of individual packages within the rotating wheel of the dehumidifier 280 so that: (1) silica gel in the supply air duct 215 is not mixed with silica gel in the first exhaust air duct 225; and (2) individual packages remain substantially stationary maintaining exhausted silica gel moving into the first exhaust duct 225 for re-charging and functioning silica gel moving into the supply air duct 215 for removing moisture from the air. In one embodiment, the silica gel may be packaged in individual spherical packages.

Figure 5:
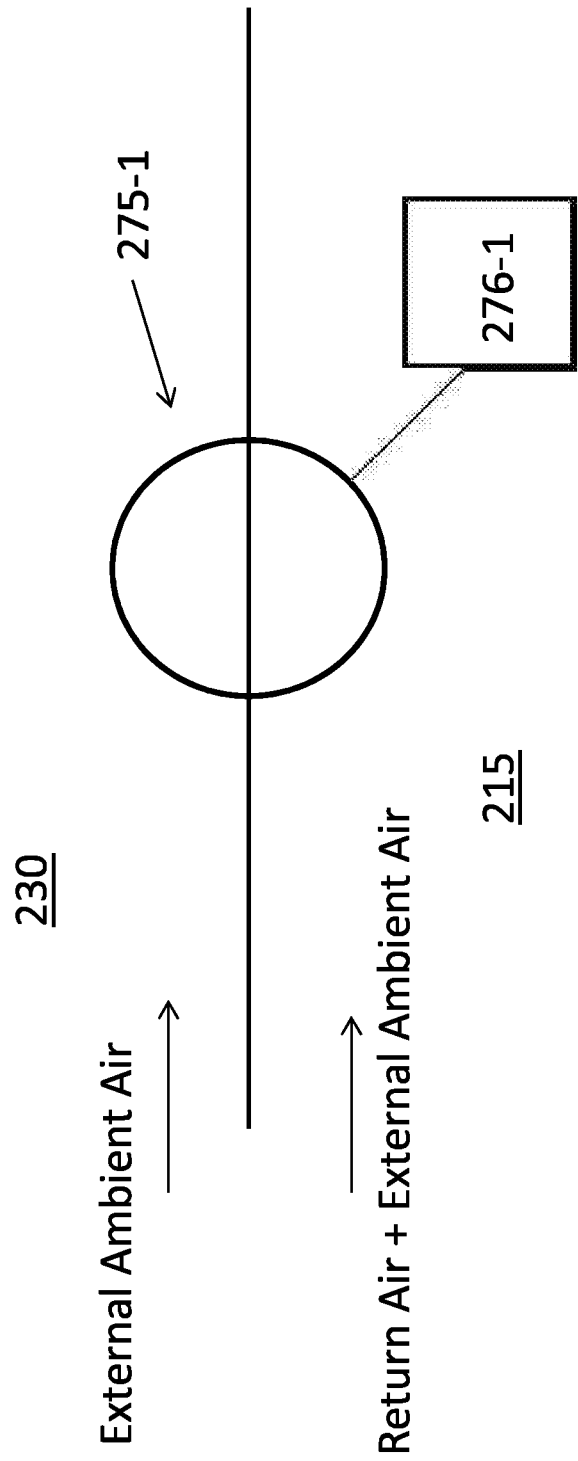
FIG. 5 illustrates a view of a first rotating housing containing phase change material integrated into the phase change system according to the embodiments of the present invention.
Figure 6:
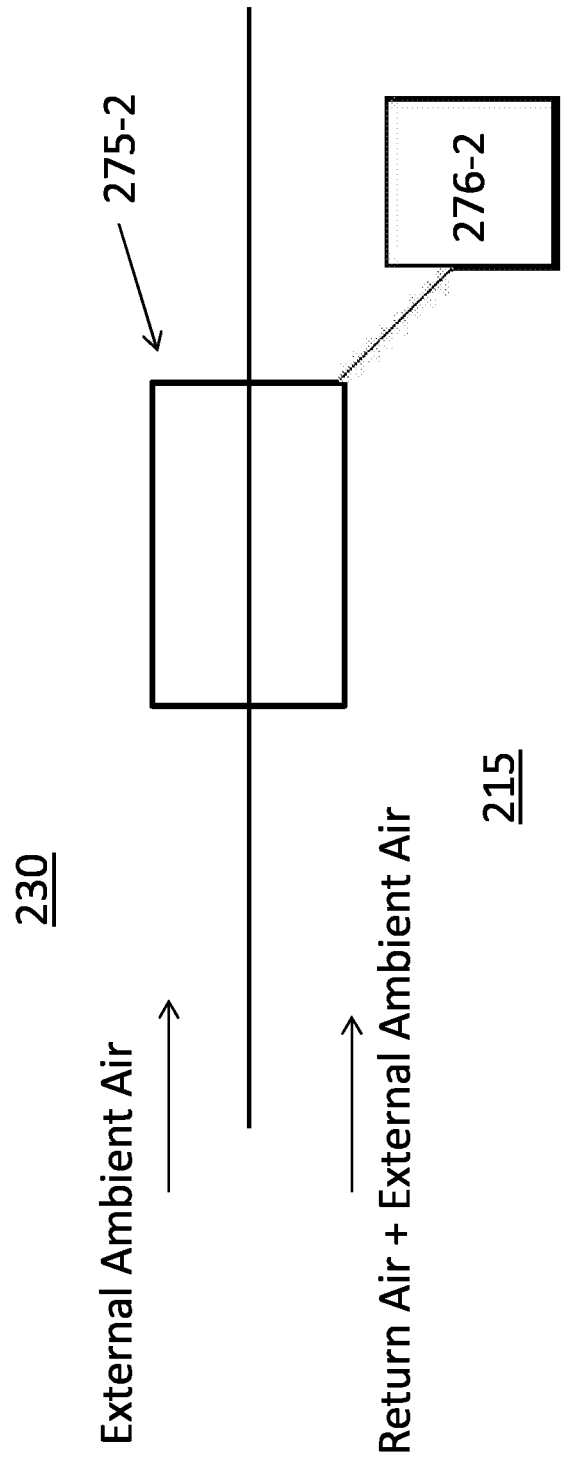
FIG. 6 illustrates a view of a second rotating housing containing phase change material integrated into the phase change system according to the embodiments of the present invention.

FIG. 5 shows a cross-sectional view of a first exemplary housing 275-1 in the form of a disc for containing the phase change material. The rotating housing 275-1 is positioned partially in the supply air duct 215 and partially in a second exhaust air duct 230. FIG. 6 shows a cross-sectional view of a second exemplary housing 275-2 in the form of a drum for containing the phase change material. In one embodiment, the phase change material is individually packaged within the housing 275-1, 275-2. The rotating housing 275-1, 275-2 is driven by a motor 276-1, 276-2 such that the phase change material is near solid or solid (i.e., heat absorbing state) when entering the supply air duct 215 to allow the phase change material to absorb heat from the air passing through the supply air duct 215 thereby further cooling the air prior to the air being directed into the subject space to be cooled.

External ambient air entering the second exhaust duct 230 is forced by the blower 260 passed the evaporative cooler 270 and a portion of the rotating housing 275-1, 275-2, for example, containing phase change material and eventually into the atmosphere. In this manner, the cool air re-solidifies the phase change material (in a heat releasing state) in the portion of the rotating housing 275-1, 275-2, for example, in the second exhaust duct 230 prior to phase change material returning to the supply air duct 215. In one embodiment, the phase change material is contained within a plurality of individual packages, packets or containers within the rotating housing 275-1, 275-2, for example, so that: (1) phase change material in the supply air duct 215 is not mixed with phase change material in the second exhaust air duct 230; and (2) individual packages remain substantially stationary maintaining liquid phase change material moving into the second exhaust duct 230 for re-solidification and solid phase change material into the supply air duct 215 for removing heat from the air. In one embodiment, the phase change material may be packaged in individual spheres. Those skilled in the art will recognize that other shapes are possible.

In another embodiment, a rotating enthalpy wheel or energy recovery ventilator may be incorporated into the supply air duct 215 to act upon the mixture of the return air and external ambient air prior to the mixture entering the HVAC module 235.

Figure 7:
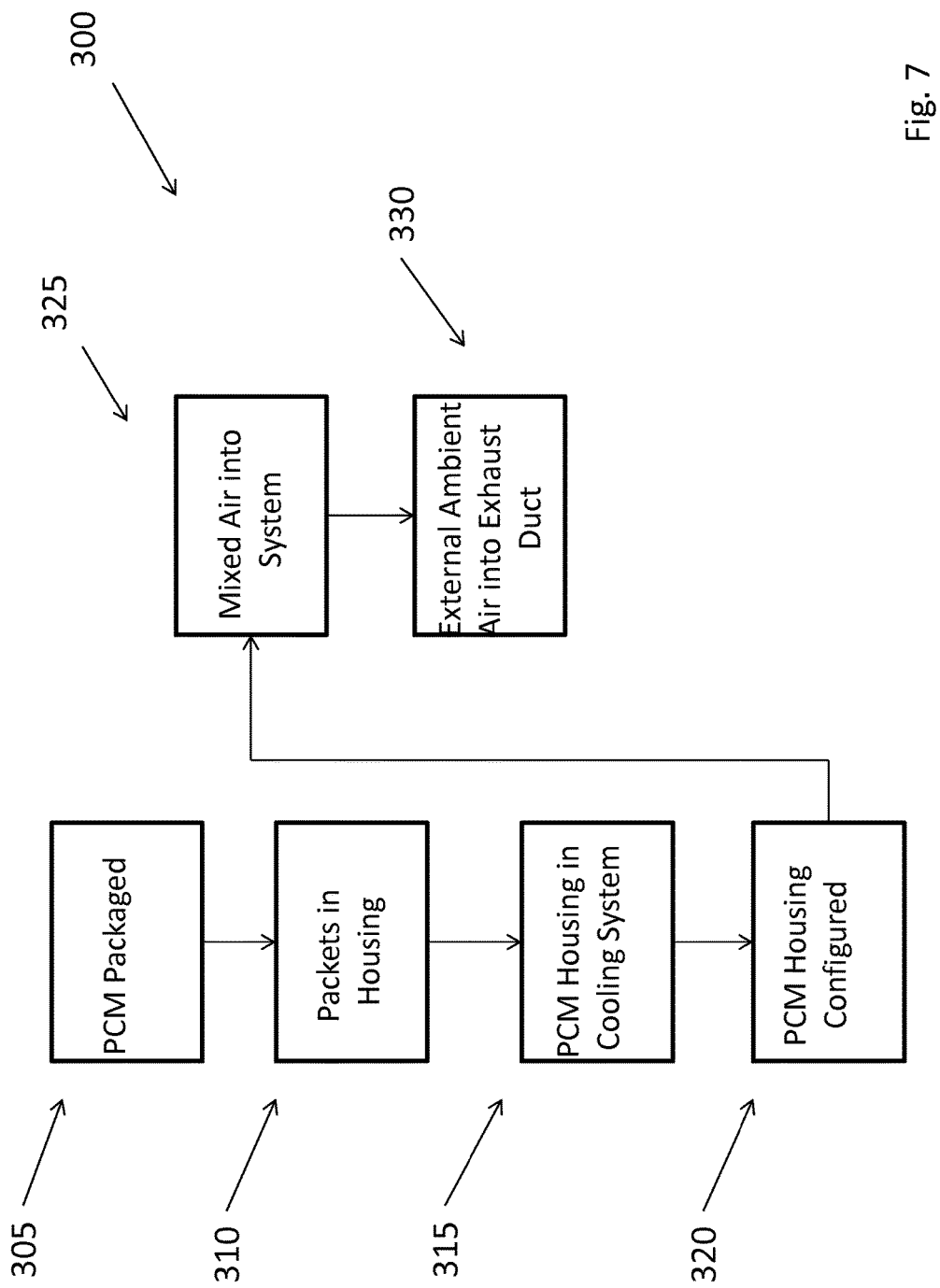
FIG. 7 illustrates a flow chart of a methodology facilitated by the phase change system according to the embodiments of the present invention.

FIG. 7 shows a flow chart 300 detailing one methodology according to the embodiments of the present invention. At 305, phase change material or a combination of phase change materials are packaged into individual packages, packets or containers. At 310, the packets are placed into a phase change material housing. At 315, the phase change material housing is positioned into a cooling system such that a first portion of the housing is within a supply air duct and a second portion of the housing is within an exhaust air duct. At 320, the phase change material housing is configured to rotate such that (i) phase change material in a substantially heat absorbing state is in the supply air duct; and (ii) phase change material in a substantially heat releasing state is in the exhaust duct. At 325, a mixture of return air and external ambient air is forced to (i) an evaporative cooler, (ii) a first portion of a rotating housing containing phase change material in a substantially heat absorbing state, (iii) a dehumidifier and (iv) a space to be cooled. At 330, external ambient air is forced to (i) the evaporative cooler, (ii) a second portion of the rotating housing containing phase change material in a substantially heat releasing state and (iii) the atmosphere.

Although the invention has been described in detail with reference to several embodiments, additional variations and modifications exist within the scope and spirit of the invention as described and defined in the following claims.

I claim:

1. A cooling system comprising:
   a supply air duct having an inlet for external ambient air to enter and leading to a space to be cooled, the supply air duct containing:
   a blower;
   an evaporative cooler; and
   a dehumidifier;
   a rotatable housing containing phase change material;
   a motor for driving the rotatable housing containing the phase change material;
   a return air duct carrying return air from the space being cooled to near the supply duct inlet for mixing with the external ambient air, said blower configured to force the mixture of return air and external ambient air to the evaporative cooler, the rotatable housing containing phase change material in a heat absorbing state, the dehumidifier and into the space to be cooled; and
   wherein said rotatable housing containing the phase change material is (i) positioned partially in the supply air duct and partially outside of the supply air duct and (ii) continuously rotated by the motor at a pre-established rate based on one or more environmental factors, including one or more or an external ambient temperature and desired indoor temperature.

2. The cooling system of claim 1 further comprising an exhaust duct adjacent to said supply air duct.

3. The cooling system of claim 2 wherein said rotatable housing containing phase change material is partially positioned within said exhaust duct.

4. The cooling system of claim 1 wherein said phase change material is individually packaged within said rotatable housing.

5. The cooling system of claim 4 wherein the phase change material is individually packaged in spherical containers.

6. The cooling system of claim 1 wherein the rotatable housing is sphere-shaped or disc-shaped.

7. The cooling system of claim 1 wherein the rotatable housing is sphere-shaped or disc-shaped.

8. A cooling system comprising:
   a supply air duct having an inlet for external ambient air to enter and leading to a space to be cooled, the supply air duct containing:
   a blower;
   a motor;
   an evaporative cooler; and
   a dehumidifier;
   an exhaust duct for receiving external ambient air;
   a rotatable housing containing phase change material, the rotatable housing positioned to continuously rotate by means of the motor within the supply air duct and the exhaust duct at a pre-established rate based on one or more environmental factors, including one or more or an external ambient temperature and desired indoor temperature;
   a return air duct carrying return air from the space being cooled to near the inlet for mixing with the external ambient air; and
   wherein the blower is configured to:
      (i) force the mixture of return air and external ambient air to the evaporative cooler, a portion of the rotating housing containing phase change material in the supply air duct, the dehumidifier and into the space to be cooled; and
      (ii) force external ambient air to the evaporative cooler, a portion of the rotating housing in the exhaust duct and into the atmosphere.

9. The cooling system of claim 8 further comprising a second exhaust duct.

10. The cooling system of claim 8 wherein said phase change material is individually packaged within said rotatable housing.

11. The cooling system of claim 10 wherein the phase change material is individually packaged in spherical packages.

12. A method for cooling a space comprising:
   forcing a mixture of return air and external ambient air through an air duct to (i) an evaporative cooler, (ii) a portion of a rotating housing containing phase change material in the air duct, (iii) a dehumidifier and (iv) a space to be cooled;
   forcing external ambient air through an exhaust duct to (i) the evaporative cooler, (ii) a portion of the rotating housing containing phase change material in the exhaust duct and (iii) the atmosphere; and
   using a motor to continuously rotate the housing at a pre-established rate based on one or more environmental factors, including one or more or an external ambient temperature and desired indoor temperature.

13. The method of claim 12 further comprising packaging the phase change material in individual packages within said rotatable housing.

14. The method of claim 13 further comprising packaging the phase change material in spherical packages.

15. A method comprising:
   individually packaging phase change material into packets;
   placing the packets into a rotatable housing;
   positioning the housing into a cooling system such that the housing is partially within a supply air duct and partially within an exhaust air duct; and
   configuring the housing to rotate continuously at a pre-established rate by means of a motor based on one or more environmental factors, including one or more or an external ambient temperature and desired indoor temperature, such that (i) phase change material in the supply air duct absorbs heat; and (ii) phase change material in the exhaust duct releases heat.

16. The method of claim 15 further comprising packaging the phase change material in individual packages within said rotatable housing.

17. The method of claim 16 further comprising packaging the phase change material in spherical packages.

18. A system comprising:
   individually packaged phase change material in a housing;
   a cooling system wherein the housing is positioned partially within a supply air duct and partially within an exhaust air duct; and
   a motor to continuously rotate the housing at a pre-established pace based on one or more environmental factors, including one or more or an external ambient temperature and desired indoor temperature, such that that (i) phase change material in the supply air duct absorbs heat; and (ii) phase change material in the exhaust duct releases heat.

19. The system of claim 18 wherein the phase change material is in individual packages.

20. The system of claim 19 wherein the phase change material is in spherical packages.

* * * * *